March 7, 1961  E. GRUNERT ET AL  2,974,032
REDUCTION OF ALUMINA

Filed Feb. 24, 1960  2 Sheets-Sheet 1

INVENTORS
Erhard Grunert
BY Jean Mercier
Dornes, McDougall, Williams & Hersh
Attorneys INVENTORS
Erhard Grunert
BY Jean Mercier
Attorneys

United States Patent Office 2,974,032
Patented Mar. 7, 1961

2,974,032

REDUCTION OF ALUMINA

Erhard Grunert, La Tronche, and Jean Mercier, Grenoble, France, assignors to Pechiney, Paris, France Filed Feb. 24, 1960, Ser. No. 10,581

24 Claims. (Cl. 75—10)

This invention relates to a new and novel method for the rapid and economical production of aluminum from oxide ores of aluminum and it relates more particularly to the preparation of aluminum by thermal reaction of carbon directly with the oxide ores of aluminum and to the preparation of a product for use in the manufacture of same.

This application is a continuation-in-part of the copending application Ser. No. 664,326, filed June 7, 1957, and of our copending application Ser. No. 798,365, filed March 10, 1959.

It is an object of this invention to produce and to provide a method for producing aluminum, and it is a related object to produce and to provide a method for producing a product in the form of aluminum carbide ($Al_3C_4$) and aluminum.

More specifically, it is an object of this invention to produce and to provide a method for producing aluminum by thermal reduction of oxide ores of aluminum and it is a related object to produce and to provide a method for producing an aluminum carbide-aluminum product containing less than 3 percent $Al_2O_3$ by the reaction of carbon with the oxide ores of aluminum.

These and other objects and advantages of this invention will hereinafter appear and for purposes of illustration, but not of limitation, embodiments of this invention are shown in the accompanying drawings in which—

Figure 1:
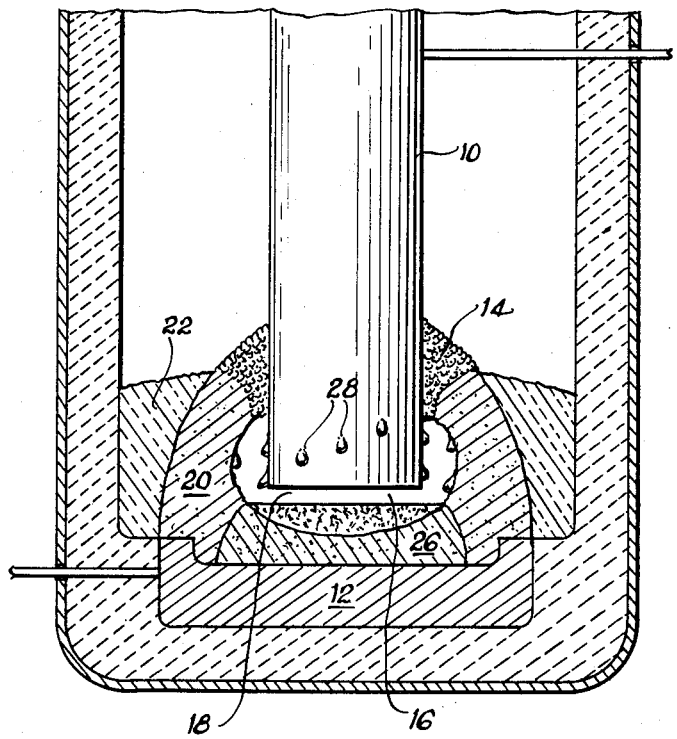
Fig. 1 is a schematic sectional elevational view of a furnace which may be employed for the preparation of aluminum in accordance with the practice of this invention.

To the present, no one has been able commercially to produce relatively pure aluminum by thermal reaction of oxide ores of aluminum. It has been known to reduce aluminum oxide with carbon at temperatures below 2100° C., generally in the neighborhood of 2000° C. It is also known that the reduction reaction between aluminum oxide and carbon starts at about 1700° C. However, at these temperatures the reaction is very slow and incomplete to the end that a product is secured from which it is difficult to recover aluminum.

On the one hand, reaction at such temperatures systematically leads to the production of highly viscous melts having, as a base, aluminum carbide containing a small amount of metallic aluminum and a large proportion of aluminum oxide of the order of several tens percent. On the other hand, losses of aluminum by volatilization become appreciable if the reaction temperature rises above 2000° C.

In an article published in the Journal of the American Ceramic Society, vol. 39, No. 1, pages 1–11, L. M. Foster, G. Long and M. S. Hunter have published the (equilibrium) phase diagram of the aluminum oxide-aluminum carbide system. In accordance with their showings a reduction of aluminum oxide with carbon at a temperature of about 2000° C., for example between 1950° C. and 2040° C., leads first of all to the formation of a more or less viscous, non-metallic, liquid phase, the formula of which corresponds to the following:

$$4Al_2O_3 \cdot Al_4C_3 \text{ or } Al_4O_4C$$

Such compounds are extremely stable and unreactive. As a result, they are incapable of use in the reaction with aluminum carbide at temperatures below 2100° C. to produce aluminum in accordance with the reaction $Al_4O_4C + Al_4C_3 \rightarrow 8Al + 4CO\uparrow$.

It has been found that formation of such stable and unreacted compounds of aluminum can be avoided and that a highly reactive melt formed of aluminum carbide ($Al_4C_3$) and aluminum having less than 3 percent aluminum oxide can be secured when aluminum oxide and carbon in suitable proportions are reacted together at a temperature in excess of 2300° C. and preferably at a temperature within the range of 2400–2500° C. in accordance with the following equations:

$$2Al_2O_3 + 9C \rightarrow Al_4C_3 + 6CO\uparrow$$
$$Al_4C_3 + Al_2O_3 \rightarrow 6Al + 3CO\uparrow$$

The foregoing reaction, which results in the production of a mixture of aluminum carbide and aluminum with less than 3 percent aluminum oxide occurs at temperatures above 2300° C. but at a relatively slow rate. A rate more suitable for commercial practice to produce a relatively pure aluminum carbide-aluminum system takes place at a reaction temperature within the range of 2400–2500° C. When reacted at this high temperature, the carbide contained in such melts becomes an efficient reducing agent to produce aluminum in accordance with the second of the above equations.

Vapors of $Al_2O$, an intermediate product of the reaction, which escape towards the top, together with part of the aluminum vapors, are condensed in the lower temperature regions, or on the components of the charge, where they are condensed according to the equation:

$$3Al_2O \rightarrow Al_2O_3 + 4Al$$

and subsequently re-enter the cycle. The carbon monoxide escapes at the top of the furnace.

Fig. 1 of the drawings diagrammatically shows a vertical section of a portion of an electric arc furnace adapted for carrying out the present invention. The furnace is provided with an electrode 10 and a conductive hearth 12. The charge 14 comprises the alumina-carbon mixture which can consist of mixed agglomerates of variable composition, or of individual components such as alumina and coke. It is also possible to replace the coke with other carbonaceous materials. The alumina can be artificial corundum or other kinds of alumina.

When the furnace is working normally, the arc 16 is stable by reason of the ionization due to the presence of aluminum vapor. Around the lower portion of the electrode, there exists an empty zone 18, the boundaries of which are defined by the electrode walls and the self-lining layer 20 consisting of partially transformed substances. The entire mass is surrounded with heat insulating material 22. The product of aluminum carbide and aluminum is indicated by the numeral 26 while the drops resulting from the condensation of $Al_2O$ and aluminum vapors are indicated by the numeral 28.

For best practice of the invention, it is desirable o avoid thermal decomposition of portions of the produced aluminum carbide while still obtaining a very low content of aluminum oxide. Under certain circumstances, aluminum carbide may be found to break down into its separate components when exposed to temperatures in excess of 2500° C. but such vapors will normally condense prior to their escape from the furnace as with carbon or aluminum oxide which might be present to enable high yield to be obtained of the desired product. The $Al_2O_3$ and $Al_4C_3$ can be caused to react in the reduction zone and substantially beneath the electrode at a temperature sufficiently high to insure a quick reduction of the last portions of alumina but at temperatures less than the dissociation point for the $Al_4C_3$.

To obtain this result, it is desirable that a mixture of alumina and carbon of uniform composition arrives regularly and continuously into the zone of the arc from the entire periphery of the electrode, in a manner to obtain and maintain a balance between the energy produced by the arc and the energy necessary for the reactions, thereby avoiding local overheating which induces the formation of graphite through the dissociation of $Al_4C_3$.

In the practice of this invention, it has been observed that there occurs, sometimes during the reduction, a certain instability of the electric arc, short circuits, and periods when the furnace runs partially as a resistance furnace. By means of another important feature of the present invention, it has been found possible to overcome these draw-backs by charging into the furnace either carbon alone or alumina alone until the disturbance disappears, depending upon the type of disturbance.

When the arc is unstable, and at the same time the evolution of CO is reduced, it is expedient to add carbon until a proper stability is obtained. When the furnace runs as a resistance furnace and the amperage increases and the evolution of carbon monoxide is reduced, then alumina can be added to restore the desired reaction conditions.

The ratio of $Al_4C_3$ to aluminum in the alloy and correspondingly the free metal content in the final product can be varied by the ratio of $Al_2O_3$ to carbon in the load.

The ratio by weight of carbon to aluminum oxide in the charge to the furnace should be such that the elements capable of entering into reaction in the reaction zone are in the stoichiometric ratio corresponding to the overall reaction leading to the formation of the mixture of aluminum carbide and aluminum which it is desired to obtain in the furnace hearth. For example, if it is desirable to produce a product containing, on the average, 80 parts by weight aluminum to 20 parts by weight aluminum carbide, the ratio of active carbon to aluminum oxide in the charge should be about 27.6 percent by weight carbon to 72.4 percent by weight aluminum oxide, or a ratio of $$\frac{\text{Weight of carbon}}{\text{Weight of } Al_2O_3} = 0.38$$

The ratio of materials in the charge can be calculated in accordance with the following equations:

$$Al_2O_3 + C = Al_4C_3 \quad (1)$$
$$Al_2O_3 + C = Al \quad (2)$$

or

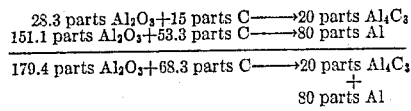

By the same calculations, it may be determined that the preparation of a product containing 50 percent by weight aluminum in combination with the aluminum carbide may be secured by a charge in which the carbon to aluminum oxide ratio is .43. Thus, depending upon the desired ratio of aluminum to aluminum carbide in the final product, the ratio of carbon to aluminum oxide in the charge may be determined.

In actual practice account should be taken, in the initial composition of the charge, of the carbon which will not in fact react with the aluminum oxide; that is, carbon which is lost, among others, through combustion and/or in the form of volatile compounds or residue.

Thus it might be stated that, for all practical purposes, the charge of carbon to aluminum oxide can fall within the range of 43 percent±10 percent.

Moreover, the mass of the charge should be so formed and constituted of the ingredients of carbon and aluminum oxide that the reaction which leads to the production of aluminum-aluminum carbide mixture can develop quickly and quantitatively. It has been established that the reduction reaction of the aluminum oxide should, preferably, be substantially completed before the mass of the charge reaches the hearth proper which contains the aluminum-aluminum carbide mixture and care should be taken to avoid introducing therein aluminum oxide in momentary excess. It has been found difficult later to reduce this aluminum oxide which readily forms melts with the carbide and these melts contaminate the entire mixture.

Moreover, the charge should have slight electrical conductivity so that a fraction of the total current is able to pass therethrough. In this connection, account should be taken of the current which it is desired to obtain in the arc, having regard to the total current in the apparatus.

The charge can be formulated, according to the practice of this invention, by a simple mixture and/or preliminary manufacture of agglomerates. In either event, the carbon and/or aluminum oxide should be in a physical form having, preferably, a small apparent density, for example inferior to about 1.5, and a large specific external surface.

As carbon, there may be used, in accordance with the practice of this invention, wood charcoal, raw or calcined petroleum coke, or carbon which has been purified chemically and which is more or less in a powdered state, sawdust, carbohydrates which are subsequently coked, or carbon which is formed in situ on the surfaces of the aluminum oxide particles as by thermal dissociation or cracking of hydrocarbons, etc. Furthermore, there may be used as the aluminum oxide component, any alumina in a more or less finely divided condition, obtained in a relatively purified state in any shape whatsoever by means of a process known per se. However, in accordance with a preferred embodiment of the present invention, blown corundum is used. Such corundum is obtained by the carbothermic reduction of aluminous ore at a temperature in the order of 2100° C., in the presence of a controlled and definite excess of carbon. The bath of pure aluminum oxide, thus obtained, is tapped and atomized, as by the action of an air jet, whereupon it solidifies in the form of hollow spherical particles. Such a process of manufacturing blown corundum is described in the application Ser. No. 759,391, filed September 8, 1958, and assigned to the assignee of the present application. Agglomerates of carbon and aluminum oxide can be produced according to any suitable technique, known per se.

Relatively pure aluminum can be produced from the mixture of aluminum carbide and aluminum as will be hereinafter be pointed out.

Figure 2:
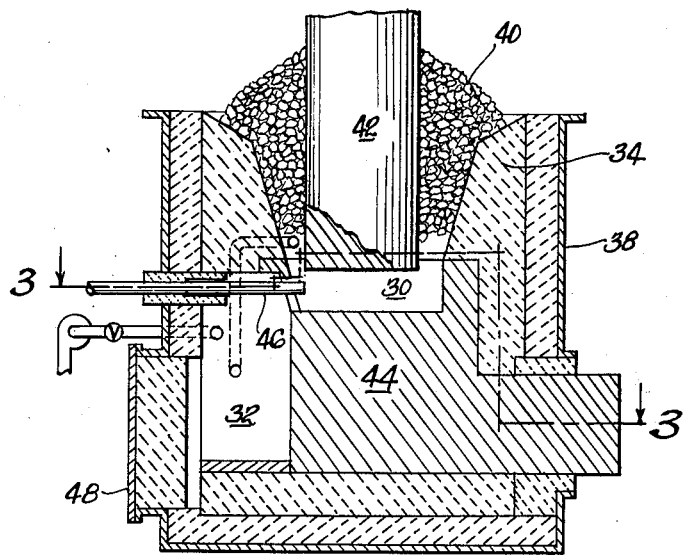
Fig. 2 is a schematic sectional elevational view of a modification in an aluminum reduction furnace for use in the continuous production of aluminum in accordance with the practice of this invention.
Figure 3:
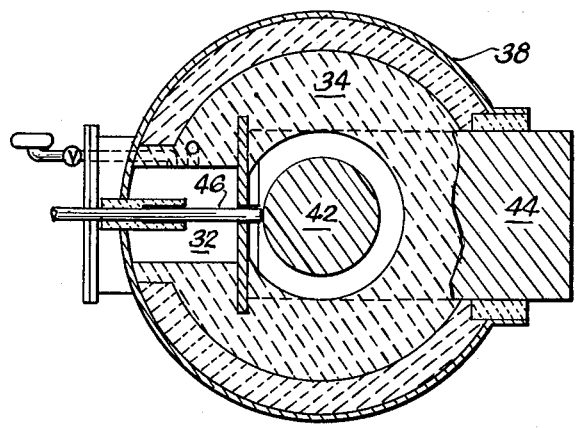
Fig. 3 is a sectional view taken substantially along the line 3—3 of Fig. 2.

Thus, for example, if the reduction of the aluminum oxide be carried out in accordance with the practice of this invention in an arc furnace of 700 kw., as illustrated in Figs. 2 and 3, there is obtained tappings of mixtures of aluminum and aluminum carbide containing more than 50 percent free aluminum and preferably in the order of 17 to 37 percent of aluminum carbide to 80 to 60 percent free aluminum with less than 3 percent of aluminum oxide. From such tappings, which permit the direct sweating, upon cooling, of a certain quantity of crude aluminum, there can be recovered the entire mass of free aluminum contained therein with a substantially quantitative yield. However, if the tapped aluminum-aluminum carbide mixture contains a quantity of aluminum oxide much in excess of 3 percent, then the removal of pure aluminum from the product can be realized with a much reduced yield.

According to the practice of this invention, reduction of aluminum oxide by carbon can be carried out in a substantially continuous process in an arc furnace such as is described in application Ser. No. 798,366, filed March 10, 1959, and represented schematically in Figs. 2 and 3 of the drawings. It will be understood that other types of heating furnaces can be used. An arc furnace of the type illustrated will possess the following characteristics.

Inside the arc furnace, adjacent to or below its hearth and within its conducting bed, there is provided a forehearth maintained at high temperature in which is received the tappings of the liquid mixture of aluminum carbide and aluminum which has collected in said hearth and obtained by piercing said hearth by means of an electrode. The mixture solidifies in this forehearth which is connected with the outside as by means of a door or locked chamber.

More particularly, in the figures, the numeral 30 designates the hearth, the numeral 32 designates the forehearth which is constructed of refractory material 34. The entire assembly is retained within a metallic frame or housing 38.

The charge, composed of carbon and aluminum oxide, is introduced into the furnace at 40 and the heat required for reaction is produced by means of an electric arc generated from the electrode 42 to provide a temperature above 2300° C. and preferably in the neighborhood of about 2400–2500° C. The inlet and outlet of the current, which may be either single or three phase, depending upon the power of the furnace, respectively correspond to the electrode 42 and the conducting bed 44 of the furnace.

The tapping of the aluminum-aluminum carbide mixture produced and collected in the hearth is obtained by piercing the wall of said hearth by means of the auxiliary electrode 46. The mixture which flows from the hearth by gravity is collected in the forehearth 32 which is protected from oxidizing atmosphere. Following solidification, the mixture is recovered through the insulated door 48.

The recovery of pure aluminum from the aluminum-aluminum carbide mixture can be accomplished by various means, for example, by distillation in vacuo. In accordance with another important feature of the present invention, the said recovery is produced by treating the aluminum-aluminum carbide mixture with a flux comprising at least one halide of a metal of the group consisting of alkaline, alkaline earth metals and aluminum, such as the fluorides and/or chlorides of sodium and/or potassium alkaline or alkaline earth metals, cryolites, etc. The quantity of flux is higher on a weight basis than that of the treated mixture and more particularly 1 to 2.5 times, and preferably on the order of about 2 times. The aluminum-aluminum carbide system is added to the flux heated at a temperature below 1000° C. and preferably in the order of about 800–850° C.

Applicants have discovered that the treatment of aluminum-aluminum carbide mixtures can lead to a substantially quantitative recovery of free aluminum contained therein if said mixture contains 3 percent or less by weight of aluminum oxide. This is confirmed by the data in the following table:

| Flux | Temperature, °C. | Duration of Treatment, Min. | Recovery Yield, Percent |
| --- | --- | --- | --- |
| 1 part NaCl+1 part KCl | About 900 | 30 | 100 |
| Do | do | 20 | 98 |
| NaCl only | do | 30 | 99 |

The liquid aluminum, obtained as the lower layer, has a purity in excess of 99 percent, actually in the order of about 99.5 to 99.7 percent or better. It is directly separated from the flux and sludge (slime) composed of flux and aluminum carbide. The said sludge is washed with cold water. The recovered aluminum carbide is dried and then recycled through the furnace.

Applicants have, moreover, established that when aluminum carbide, which has been recovered at the end of the treatment, is mixed with a charge composed of carbon and aluminum oxide, as previously described, there is produced in practice a decrease of the same quantity of aluminum carbide directly produced from the ingredients of the charge. As a result, it is desirable to modify the theoretical carbon to aluminum oxide ratio by weight of said charge on the supposition that, in this case, the total quantity of aluminum oxide is transformed into aluminum according to the following equation:

$$Al_2O_3 + 3C = Al + 3CO$$

Thus, for example, for each one part of aluminum carbide recycled, it is advisable to add 7.5 parts of aluminum oxide and 2.7 parts of carbon in a theoretical ratio by weight of 0.35 in lieu of the 0.38 previously stated. In effect, this amounts to a further increase in the yield of pure aluminum produced by the process of this invention.

A further concept of this invention resides in a means for avoiding the collection of titanium in the aluminum during the reduction of aluminum oxide with carbon. It may happen that the titanium content of the produced aluminum may be greater than that required in the subsequent utilization of the aluminum. In that event, there is added to the reaction products, small quantities of any boron compound capable of forming a boro-titanium compound under the operating conditions. As the boron compound, use can be made, amongst others, of borax, boric acid, boron carbide, boracite, etc. The quantity of the boron compound used is preferably one to two times that theoretically required for the stoichiometric conversion of the titanium contained in the aluminum oxide or other charge material and for conversion of the titanium into a boro-titanate.

The boron compounds are either directly introduced into the furnace during the reduction of aluminum oxide by carbon or they can be added and/or mixed with the charge of corundum and/or carbon supplied to the furnace.

The boro-titanate compound formed is collected with the sludge (slime) during the step of recovering the aluminum from the aluminum-aluminum carbide mixture produced in accordance with the practice of this invention, as previously described.

For example, when starting with corundum containing 0.3 percent by weight titanium, there is obtained aluminum assaying containing 0.0002 percent by weight titanium. The titanium accumulates as boro-titanium compounds in the residue from the aluminum extraction which may then contain titanium in the amount of about 1 percent by weight.

Aluminum obtained in accordance with the practice of this invention will be found to contain less titanium than the aluminum produced by the electrolysis of alumina. Thus the product can advantageously be utilized in all applications which have previously been made of aluminum.

The treatment with boron is the subject matter of a copending application, Ser. No. 798,351, filed on March 10, 1957.

The following example, which is given by way of illustration, but not by way of limitation, serves to set forth the process of this invention in its various operating phases:

Into a single phase electric arc furnace of 700 kw., having a conducting bed of carbon and provided with an electrode 70 centimeters in diameter, there is supplied to a thickness of several tens of centimeters and of the order of 40 centimeters and over, a mixture of 100 kg. of corundum and 50 kg. of wood charcoal. The corundum is in the form of hollow spherical particles of few millimeters in diameter. The losses of wood charcoal by way of combustion products or in other forms will be in the order of 20 percent by weight under the operating conditions of the furnace.

The furnace operates with 15,000 to 20,000 amperes and the height of the electrode is automatically regulated by means of a self-regulating device as a function of the current strength. Under these conditions, the hot zone of the furnace is at a temperature of about 2400° C. or higher. After four hours of operation, there is obtained in the hearth of the furnace a molten aluminum-aluminum carbide mixture having a thickness of about 12 centimeters. The mixture is tapped by using the auxiliary electrode 46 which pierces the bottom of the hearth 30 for flow of the liquid mixture into a forehearth 32, as described above.

The furnace is then recharged with a mixture composed of 100 kg. corundum, 44 kg. wood charcoal and 18 kg. of recovered and recycled aluminum carbide. The aluminum-aluminum carbide mixture which weighs 140 kg. is constituted of coarse crystals of aluminum carbide in the form of thin lamellae (scales) which appear to envelope the aluminum. This mixture is composed of:

|  | Percent by weight |
|---|---|
| $Al_4C_3$ | 21.7 |
| Al | 75.4 |
| $Al_2O_3$, AlN, etc. | 2.9 |

By way of still further example, in a three phase electric furnace, operating on 2700 kw., comprising a carbon conductive hearth with three precrucibles therein and three carbon electrodes of about 70 centimeters in diameter, the distance between the axis of each electrode would be in the order of about 120 centimeters. A mixture is continuously charged into the furnace comprising charcoal and agglomerates produced by coking a mixture consisting essentially of:

100 parts by weight blown corundum
3 parts by weight borax
35 parts by weight recycled aluminum carbide
25 parts by weight pitch The diameter of the agglomerates is on the order of 10–15 centimeters and they will contain about 10 percent by weight of free carbon. The charcoal divided by agglomerates ratio in the charge is in the order of about 0.17 by weight. The carbon losses, as combustion products and the like, will be of the order of about 20 percent by weight under the operating conditions existing in the furnace.

The voltage will be of the order of 64 volts and the height of the electrodes is automatically regulated with reference to the intensity by means of self-regulators. Under these conditions, the hot zone of the furnace will be at a temperature greater than 2300° C. and preferably in the order of 2400° C. or above.

The furnace will be capable of producing about 330 kg. per hour of a molten mixture which is almost continuously tapped into one or the other of the precrucibles. By precooling and during solidification, this mixture lets aluminum exude. After solidification this mixture looks like crystals of aluminum substantially enclosed in crystals of aluminum carbide and the product will have the following analysis:

|  | Percent by weight |
|---|---|
| $Al_4C_3$ | 37.1 |
| Al | 60.0 |
| $Al_2O_3$, AlN, etc. | 2.9 |

The analysis of the foregoing products was carried out as follows: The aluminum-aluminum carbide mixture was treated with dilute hydrochloric acid. The gases liberated (methane and hydrogen) were burned on copper oxide. The water and carbonic acid gases formed were analyzed to determine their amounts by weight. The entire amount of aluminum derived from the alumina, as well as from the aluminum carbide, and the aluminum from the aluminum-aluminum carbide mixture, is soluble in dilute hydrochloric acid. The entire alumina is then precipitated by any means known per se. The alumina contained in the aluminum-aluminum carbide mixture is then determined by calculating the difference between the total alumina and the aluminum and aluminum carbide, which have been determined in accordance with the foregoing.

The aluminum-aluminum carbide mixture having the composition tabulated above is then treated at a temperature of about 850° C. with about twice its weight of flux having sodium chloride for a base. There is obtained a lower layer of pure aluminum surmounted by a flux and sludge composed of aluminum carbide and flux. The sludge is washed with water and at a temperature of no more than 30° C. or less and the aluminum carbide is recovered and dried for recycling.

From such furnaces, there are regularly obtained tapping similar to those described above containing between 50 and 80 percent by weight free aluminum. This aluminum is recoverable from the aluminum carbide crystals. The resulting aluminum is relatively pure and may be found to have the following analysis:

Fe=0.15 percent by weight
Si=0.10 percent by weight
Ti$\angle$0.0002 percent by weight
V$\angle$0.002 percent by weight
Ca$\angle$0.001 percent by weight
Mg$\angle$0.001 percent by weight
Zn=0.002 percent by weight
C=0.008 percent by weight Further, this aluminum possesses an electric conductivity equal to at least 63.3 percent that of copper.

It will be understood that changes may be made in the details of construction and arrangement of the furnaces as well as in the form or the methods of materials which are charged therein and in process steps, without departing from the spirit of the invention, especially as defined in the following claims.

We claim:
1. The process of reducing alumina comprising the step of subjecting a charge of alumina and carbon to the action of an electric arc, and heating the charge to a temperature within the range of about 2400°–2500° C., and thereby forming and maintaining a molten mixture of aluminum and aluminum carbide containing a quantity of alumina less than about 3 percent.

2. The process according to claim 1, wherein the charge is fed by gravity into the zone of the arc as the alumina is reduced.

3. The process according to claim 1, wherein the reducing operation is controlled by adding alumina only to the charge in the furnace.

4. The process according to claim 1, wherein the reducing operation is normalized by adding carbon only to the charge in the furnace.

5. The process according to claim 1, wherein the charge to the furnace comprises wood charcoal and hollow spherules of corundum.

6. The process of reducing alumina comprising the following steps: supplying to an electric furnace, provided with a conductive hearth and an electrode, a charge of free flowing, particulate alumina and carbonaceous material, whereby said charge descends by gravity and surrounds the electrode; passing a current through the electrode and the charge, whereby the furnace is preheated; thereafter establishing an arc between the electrode and the hearth and raising the temperature of the charge to a temperature within the range of about 2400°–2500° C., whereby the alumina in the region of the hearth is reduced, producing a mixture of aluminum and aluminum carbide which forms a molten layer on the bottom of the hearth, said mixture containing a quantity of alumina and aluminum carbide less than about 3 percent, maintaining a temperature of the order of about 2400° C. in said layer; continuing to supply further quantities of the charge to the region of the arc whereby the freshly charged material is at a temperature lower than the reaction temperature to condense vapors of $AlO_2$ and aluminum which might rise from the molten reaction product and removing said molten mixture from the hearth.

7. The process according to claim 6 wherein the charge contains about 30 percent of carbonaceous material.

8. The process according to claim 1 wherein a portion of the produced aluminum carbide dissociates into (a) gaseous aluminum which is condensed and recovered, and (b) graphite crystals which form a layer on top of the molten mixture.

9. The method of producing a mixture of aluminum and aluminum carbide substantially free from aluminum oxide, comprising the step of reacting aluminum oxide with carbon at a temperature of about 2400° C. so that the reactions that take place consist essentially of $$2Al_2O_3 + 9C \rightarrow Al_4C_3 + 6CO\uparrow$$

and $$Al_2O_3 + Al_4C_3 \rightarrow 6Al + 3CO\uparrow$$

10. The method according to claim 9 wherein said mixture is substantially free from thermally decomposed aluminum carbide.

11. The method according to claim 10 wherein the reaction temperature is within the range of about 2400° to about 2500° C.

12. As a novel product, a mixture consisting essentially of aluminum and aluminum carbide containing less than about 3 percent of aluminum oxide.

13. The process of reducing alumina comprising the step of subjecting a charge of alumina and carbon to the action of an electric arc and heating the charge to a temperature above 2300° C. and thereby forming and maintaining a molten mixture of aluminum and aluminum carbide containing less than about 3 percent by weight aluminum oxide.

14. The method of producing a mixture of aluminum and aluminum carbide substantially free of aluminum oxide comprising the step of reacting aluminum oxide with carbon at a temperature above 2300° C. so that the reactions that take place consist essentially of

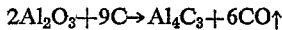

and

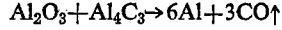

15. The process of producing aluminum comprising the steps of subjecting a charge of alumina and carbon to the action of an electric arc and heating the charge to a temperature above 2300° C. and thereby forming and maintaining a molten mixture of aluminum and aluminum carbide, and recovering free aluminum from the aluminum carbide-aluminum mixture.

16. The method of producing aluminum comprising the steps of reacting aluminum oxide with carbon at a temperature above 2300° C. but below 2500° C. so that the reactions that take place consist essentially of

and

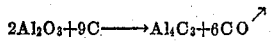

and recovering free aluminum from the product thereof.

17. The method as claimed in claim 16 wherein the charge of carbonaceous material to aluminum oxide is within the range of 43 percent±10 percent by weight.

18. A continuous process for manufacture of aluminum by reducing aluminum oxide with carbon at high temperatures comprising the steps of forming a charge of aluminum oxide and carbonaceous material, feeding said charge to a furnace, heating the charge in the furnace to a temperature above 2300° C. thereby forming a liquid mixture of free aluminum and aluminum carbide, regularly removing the liquid mixture while continuing the operation of the furnace, and recovering free aluminum therefrom.

19. The process as claimed in claim 18 wherein the quantity of carbon in the charge corresponds to the stoichiometric ratio of carbon required for the reduction of aluminum oxide to form a liquid aluminum-aluminum carbide mixture containing less than 3 percent aluminum oxide and containing more than 50 percent free aluminum.

20. The process as claimed in claim 18 wherein the furnace is an electric arc furnace and the charge has slight electrical conductivity to enable control of the amount of current passing through the arc.

21. The process as claimed in claim 18, wherein the removed liquid aluminum-aluminum carbide mixture is cooled to solidification temperature, mixing said mixture at a temperature lower than 1000° C. with a flux consisting substantially of halide of at least one metal selected from the group consisting of alkali, alkaline earth metals and aluminum, and heating the mass to a temperature lower than 1000° C. to separate purified aluminum from the remainder of the mass.

22. The process as claimed in claim 18 wherein the removed liquid aluminum-aluminum carbide mixture is cooled slowly to solidification temperature, mixing the crystals at a temperature lower than 1000° C. with a flux in the form of halide of at least one metal selected from the group consisting of alkali, alkaline earth metals and aluminum, and heating the mass to a temperature lower than 1000° C. to separate purified aluminum from the remainder of the mass.

23. The process as claimed in claim 21 which includes the step following the recovery of the free aluminum from the mixture of washing the remainder containing aluminum carbide with water to separate the aluminum carbide, drying the separated aluminum carbide and recycling the aluminum carbide as a part of the charge to the reaction furnace.

24. The process as claimed in claim 14 in which the composition of the charge including any recycle of recovered aluminum carbide contains a ratio of carbon to aluminum oxide corresponding to the equation:

$$Al_2O_3 + 3C = 2Al + 3CO$$

References Cited in the file of this patent

UNITED STATES PATENTS

| | | |
|---|---|---|
| 1,219,797 | Barnett et al. | Mar. 20, 1917 |
| 1,222,593 | Barnett et al. | Apr. 17, 1917 |
| 2,090,451 | Kruh | Aug. 17, 1937 |
| 2,255,549 | Kruh | Sept. 9, 1941 |
| 2,755,178 | Rasmussen | July 17, 1956 |
| 2,776,884 | Grunert | Jan. 8, 1957 |
| 2,829,961 | Miller et al. | Apr. 8, 1958 |

UNITED STATES PATENT OFFICE
CERTIFICATION OF CORRECTION

Patent No. 2,974,032

March 7, 1961

Erhard Grunert et al.

It is hereby certified that error appears in the above numbered patent requiring correction and that the said Letters Patent should read as corrected below.

Column 9, line 69, the equation should appear as shown below instead of as in the patent:

$$2Al_2O_3 + 9C \longrightarrow Al_4C_3 + 6CO$$

column 10, line 3, the equation should appear as shown below instead of as in the patent:

$$Al_2O_3 + Al_4C_3 \longrightarrow 6Al + 3CO$$

Signed and sealed this 1st day of August 1961.

(SEAL)
Attest:

ERNEST W. SWIDER
Attesting Officer

DAVID L. LADD
Commissioner of Patents